(12) United States Patent
Meeks et al.

(10) Patent No.: US 6,751,044 B1
(45) Date of Patent: Jun. 15, 2004

(54) METHOD AND APPARATUS FOR READING A CLOCK TRACK WITH A MAGNETO-OPTICAL CLOCK HEAD USING THE TRANSVERSE KERR EFFECT

(75) Inventors: Steven W. Meeks, San Jose, CA (US); Richard D. LeSage, Longmont, CO (US); David S. McMurtrey, Loveland, CO (US); Peter R. Svendsen, Colorado Springs, CO (US); W. Craig Tomalty, Colorado Springs, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/430,614

(22) Filed: Oct. 29, 1999

(51) Int. Cl.$^7$ ............................................... G11B 5/596
(52) U.S. Cl. ..................................... 360/77.03; 360/51
(58) Field of Search ............................... 360/77.03, 75, 360/78.11, 51; 369/110.1, 110.04, 13.05, 44.25

(56) References Cited

U.S. PATENT DOCUMENTS

| | | | | |
|---|---|---|---|---|
| 4,873,430 A | * | 10/1989 | Juliana et al. | 250/225 |
| 5,339,204 A | * | 8/1994 | James et al. | 360/51 |
| 5,416,583 A | * | 5/1995 | Sanzari | 356/469 |
| 5,586,101 A | * | 12/1996 | Gage et al. | 369/110.02 |
| 5,696,752 A | * | 12/1997 | Hajjar et al. | 369/107 |
| 5,726,455 A | * | 3/1998 | Vurens | 250/225 |
| 5,929,994 A | * | 7/1999 | Lee et al. | 250/228 |

OTHER PUBLICATIONS

Fowler, David E., "Magneto–optic Kerr Rotation" in *Encyclopedia of Materials Characterization*, Editors: C. Richard Brundle, C.A. Evans, Jr. and Shaun Wilson, Butterworth–Heinemann, Boston, 1992, pp. 723–735.

* cited by examiner

Primary Examiner—David Hudspeth
Assistant Examiner—K. Wong
(74) Attorney, Agent, or Firm—Tejpal S. Hansra (57) ABSTRACT

A magneto-optical clock head is disclosed. The magneto-optical clock head allows a longitudinally recorded clock track to be read from a disk surface from a position outside of a head-disk assembly (HDA). The clock track has sections of alternating magnetization which define transitions. Importantly, the magneto-optical clock head is used to sense the transitions using the transverse Kerr effect, as opposed to the longitudinal Kerr effect as used in one prior technique. In one embodiment, the magneto-optical clock head includes a light source for generating a p-polarized beam which is aligned in such a manner that it strikes the clock track. A reflected beam is then produced which has an intensity that varies based upon the direction of the magnetization of the sections of alternating magnetization of the clock track due to the transverse Kerr effect. A detector is provided to detect the intensity variations in the reflected beam and to ultimately generate a clock signal which is provided to transducers to allow them to appropriately write servo information onto their respective disk surfaces. A method for optically reading a clock signal stored within a clock track which is written onto a disk surface that is located within a head disk assembly of a disk drive is also provided.

43 Claims, 4 Drawing Sheets

METHOD AND APPARATUS FOR READING A CLOCK TRACK WITH A MAGNETO-OPTICAL CLOCK HEAD USING THE TRANSVERSE KERR EFFECT

FIELD OF THE INVENTION

The present invention relates to magnetic storage devices and, more particularly, to a method and apparatus for reading a clock track, that has been written onto a magnetic disk surface of a disk drive, using a magneto-optical clock head. Accordingly, the magnetic disk surface can be enclosed in a head disk assembly (HDA) prior to servo writing and the magneto-optical clock head can be used to read the clock track written on the magnetic disk surface, so that servo writing may be performed outside of a clean room environment (provided that a non-contact type actuator positioning apparatus is also used).

BACKGROUND OF THE INVENTION

A disk drive system is a data storage device. Among other things, a disk drive system includes a plurality of disks which are mounted for rotation about a common axis. Generally, each of the disks has a pair of disk surfaces which are coated with a magnetic material that is capable of changing its magnetic orientation in response to an applied magnetic field. Data is stored digitally within concentric tracks on one or more of the disk surfaces.

Each disk surface has at least one magnetic transducer associated therewith. Generally, each of the magnetic transducers is attached on the end of an actuator arm. All of the actuator arms, and hence the transducers, are ganged together so that they move over their respective disk surfaces in unison. However, only one transducer is capable of reading data from or writing data to a disk surface at any given time.

During operation of a disk drive, each of the disks are rotated about an axis at a substantially constant rate. To read data from or write data to a disk surface, a magnetic transducer is positioned above a desired track of the disk while the disk is spinning.

Writing is performed by delivering a write signal having a variable current to the transducer while the transducer is held close to the desired track. The write signal creates a variable magnetic field at a gap portion of the transducer that induces magnetic polarity transitions into the desired track. The magnetic polarity transitions are representative of the data being stored.

Reading is performed by sensing the magnetic polarity transitions on a track with the transducer. As the disk spins below the transducer, the magnetic polarity transitions on the track present a varying magnetic field to the transducer. The transducer converts the varying magnetic field into an analog read signal that is then delivered to a read channel for appropriate processing. The read channel converts the analog read signal into a properly timed digital signal that can be further processed and then provided to a host computer system.

The transducer can include a single element, such as an inductive read/write element for use in both reading and writing, or it can include separate read and write elements. Transducers that include separate elements for reading and writing are known as "dual element heads" and usually include a magneto-resistive (MR) read element for performing the read function.

As is well known in the art, in order to properly position the transducers with respect to their respective disk surfaces, a disk drive system includes a servo system which uses servo information recorded on one or more of the disk surfaces. In general, there are two main types of servo systems. The first type of servo system is known as a dedicated servo system, where a single dedicated disk surface only includes servo information. The dedicated disk surface cooperates with a dedicated servo transducer, which is ganged together with data transducers, to provide positioning information to the data transducers so that the data transducers may be appropriately positioned with respect to their respective disk surfaces. The second type of servo system is known as a sectored servo system and includes sectors of servo information which are interspersed between sectors of data on each of the disk surfaces. As a transducer flies over its respective disk surface, it periodically obtains positioning information from the sectors of servo information recorded on the disk surface so that it can be properly positioned with respect to the surface.

For the two types of servo systems described above, servo information is either written over an entire disk surface (as in the case of a dedicated servo system) or over periodic sections of a disk surface (as in the case of a sectored servo system). In either case, however, it is crucial that the servo information be written accurately.

Servo information is written during the manufacturing process. The process of writing servo information onto one or more of the disk surfaces is known as servo writing or servo track writing. In most conventional systems, an external device known as a servo track writer (STW), which includes its own transducer (STW transducer or clock head), is used to write a servo clock track onto a disk surface upon which servo information is to be written. The transducers of the disk drive system (as opposed to the STW transducer) are used to write servo information onto one or more of the disk surfaces.

More specifically, the transducers of the disk drive system are "placed" and "held" at an appropriate radial distance from the center of the disk using a variety of well-known techniques, such as by using one of a variety of mechanical push-pin systems. As the STW transducer reads timing information from the servo clock track, the transducers of the disk drive system are instructed to write servo information at a specified radial location on their respective disk surfaces (i.e., the position the transducers are being "held" at) based on the timing information read from the clock track. The transducers are then moved to a different radial location and the process is repeated. Accordingly, servo information is placed the disk surfaces at specified radial distances and is based upon the timing information read by the STW transducer from the servo clock track.

Traditionally, servo writing has been performed in clean room environments because STW transducers, which are used to read the clock track, and mechanical push-pin systems, which are used to position the transducers of the disk drive system, (both of which are external to the disk drive system) require the disk surfaces of the disk drive system to be exposed so that they can perform their respective functions. Hence, clean room environments have been used to prevent contaminants from entering the disk drive system, since contaminants can, among other things, negatively affect: (1) the proper writing of servo information onto the disk surfaces by the transducers of the disk drive; and, (2) the proper reading of the servo clock track by the STW transducer.

Because it is generally relatively expensive to maintain a clean room environment, advances have been made in the servo writing process so that it can be performed outside of a clean room environment. For example, optical push-pin systems have been developed, which permit the transducers of a disk drive system to be positioned without being contacted (e.g., via a laser beam and associated components), so that the positioning aspect of servo writing no longer requires the disk surfaces to be exposed. Additionally, prior to the discovery of the present invention, at least one type of magneto-optical clock head has been developed which permits clock track information to be read without requiring the disk surfaces to be exposed. Accordingly, by using one of the many optical push-pin systems and a magneto-optical clock head, the disk surfaces and transducers of a disk drive system can be sealed (in a HDA) prior to servo writing, so that servo writing can be performed outside of a clean room environment.

The aforementioned-type of magneto-optical clock head is described in U.S. Pat. No. 5,339,204 to James et al. entitled "System and Method for Servowriting a Magnetic Disk Drive" (hereinafter "the '204 Patent"). In general, the '204 Patent describes a method and apparatus for servo track writing outside of a clean room environment. According to the '204 Patent, a clock track is written onto a disk surface inside a sealed head disk assembly (HDA). The clock track is read by a magneto-optical head through a window in the housing of the HDA, which provides timing information to the transducers of the disk drive so that the transducers may write servo information onto their respective disk surfaces based on the timing information read by the magneto-optical clock head.

As explained in the '204 Patent, the clock track is read by directing a laser beam onto the clock track located on the surface of a disk and measuring the changes in polarization of the beam as it is reflected off of the disk surface. The polarization changes are representative of changes in the direction of magnetization of the clock track. This phenomenon is known as the longitudinal Kerr effect. Further details of the system and method of the '204 Patent may be obtained by referring to the '204 Patent directly. The above synopsis is intended to be a general overview, rather than thorough discussion, of the '204 Patent.

One of the major drawbacks of the system and method described in the '204 Patent is that the polarization of the beam may be affected by the birefringence of the window through which it enters and exits the disk drive. Therefore, in practical systems, compensation circuitry is required to compensate for such birefringence so that the clock track may be accurately read.

Another drawback of the system and method of the '204 Patent is that, because the laser beam does not enter the window near Brewster's angle, energy may be lost due to reflections off of the window. Accordingly, the reflected signal may be more difficult to detect. Hence, the clock track may not be properly read.

A third drawback of the system and method of the '204 Patent is that a relatively large number of components are required in order for the system to function properly. Specifically, in the embodiments shown in FIGS. 3a and 3b of the '204 Patent, among other things, at least two beam splitters (310 and 316) and two photo diode detectors (304, 304) are required for each embodiment. The large number of components required for the system and method of the '204 Patent may increase manufacturing costs and, hence, the cost of disk drives to consumers.

Accordingly, there is a need to develop a method and apparatus for reading a clock track located on a disk surface that is sealed within a HDA assembly by using a magneto-optical clock head that: (1) is not significantly affected by the birefringence effects of the window through which its laser beam enters, (2) does not lose significant amounts of energy due to reflections off of the window through which its laser beam enters, and (3) does not require a relatively large number of components.

SUMMARY OF THE INVENTION

The present invention is designed to overcome the aforementioned problems and meet the aforementioned, and other, needs.

It is an object of the present invention to provide a method and apparatus for reading a clock track located on a disk surface sealed within a HDA using a magneto-optical clock head, so that servo writing may be performed outside of a clean room environment. In contrast to the system described in James et al. which relies on being able to detect changes in polarization of a reflected beam, the present invention makes use of the transverse Kerr effect which relates to changes in the intensity of a reflected beam based upon the magnetization to which its corresponding incident beam is subjected to. Thus, instead of having to compensate for changes in polarization due to the birefringence effects of a window through which an incident beam and its corresponding reflected beam pass, such birefringence effects may be ignored. Furthermore, the incident beam can enter the HDA through the window at Brewster's angle for the material comprising the window which will minimize reflections off of the window. Accordingly, the present invention: (1) is not significantly affected by the birefringence effects of the window through which the incident laser beam enters and the reflected laser beam exits, (2) does not lose significant amounts of energy due to reflections off of the window through which its laser beam enters, and (3) does not require a relatively large number of components.

Other objects, features and advantages of the invention will be apparent from the following specification taken in conjunction with the following drawings.

DETAILED DESCRIPTION OF THE PREFERRED EMBODIMENT

While this invention is susceptible of embodiments in many different forms, there is shown in the drawings and will herein be described in detail, preferred embodiments of the invention with the understanding that the present disclosure is to be considered as an exemplification of the principles of the invention and is not intended to limit the broad aspects of the invention to the embodiments illustrated.

The present invention utilizes the transverse Kerr effect to optically read a clock track from a disk surface. Utilizing the transverse Kerr effect to read the clock signal in connection with the preferred embodiment of the magneto-optical clock head described herein: (1) prevents the birefringence of the window from significantly affecting the detection of the clock signal; (2) prevents the beam from losing a significant amount of energy due to reflections off of the window; and, (3) allows relatively few components to be used (as compared to the device disclosed in James et al.).

Figure 1A:
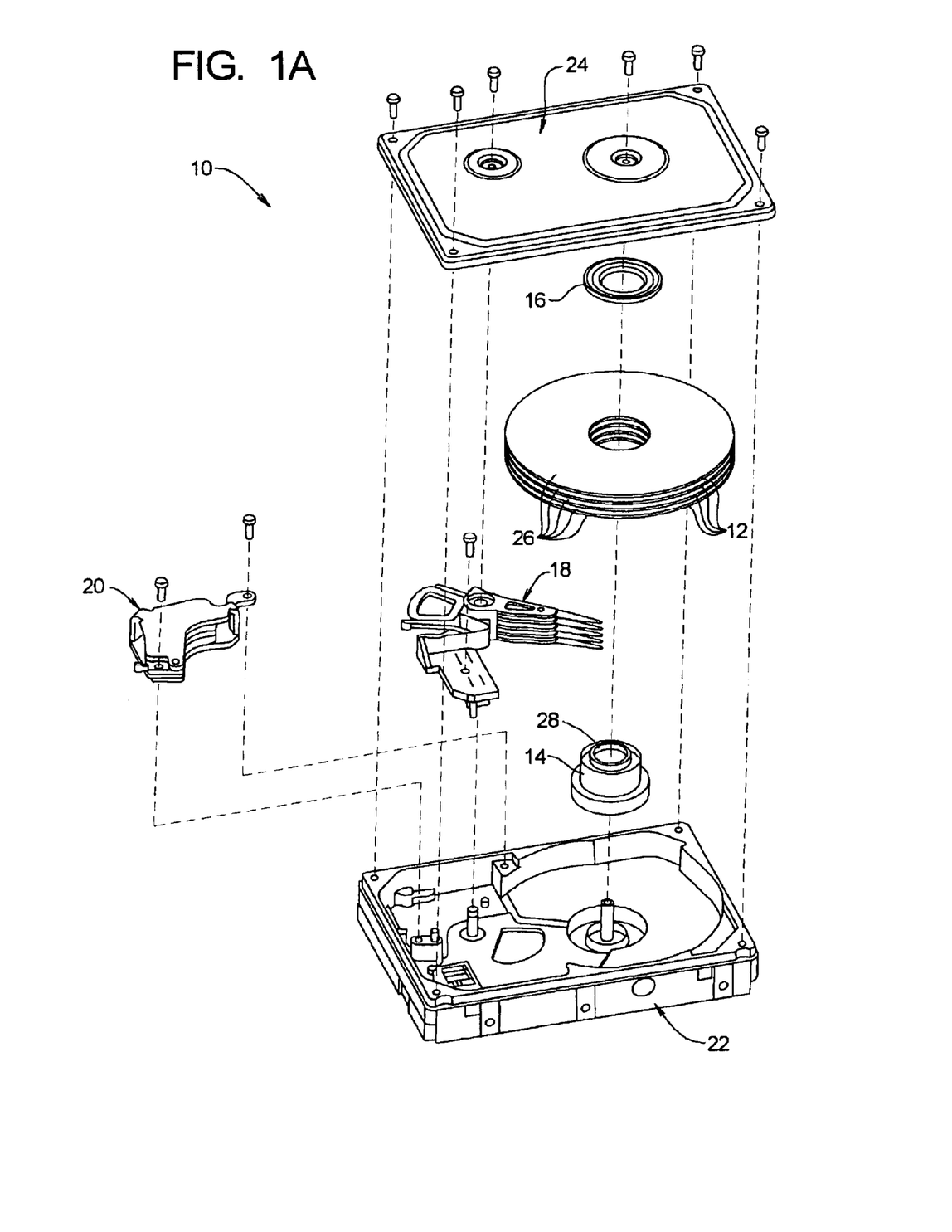
FIG. 1A is an exploded perspective view illustrating certain components of a conventional disk drive system.

FIG. 1 illustrates an exploded view of a disk drive system, generally designated 10. The disk drive system 10 comprises a plurality of disks 12 (which are held in fixed relation to one another by the combination of hub 14 and disk clamp 16), an actuator arm assembly 18, a voice-coil motor magnet assembly 20, a base plate 22 and a cover 24.

The plurality of disks 12 each have a pair of disk surfaces 26, 26. The disks 12 are mounted on hub 14 and are designed to rotate about an axis 28 of the hub 14.

Figure 1B:
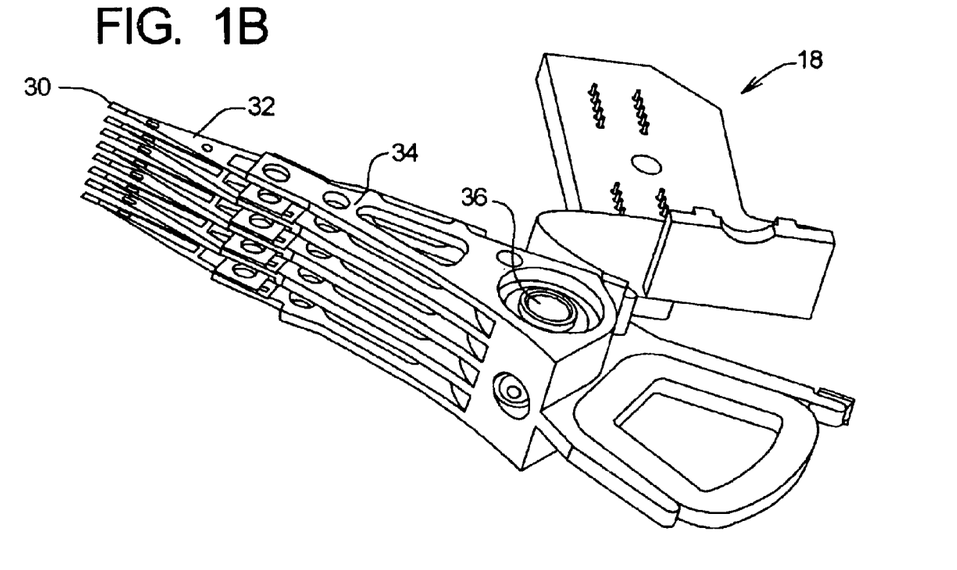
FIG. 1B is an enlarged perspective view of an actuator arm assembly of a conventional disk drive system.

The actuator arm assembly 18 (illustrated in an enlarged view in FIG. 1B) includes a plurality of transducers 30, each of which correspond to a disk surface 26. Each transducer 30 is mounted to a corresponding flexure arm 32 which is attached to a corresponding actuator arm 34 that can rotate about a bearing assembly 36. The actuator arm assembly 18 cooperates with a voice-coil motor magnet assembly 20 (shown in FIG. 1A), as will be understood by those skilled in the art, which moves the transducers 30 relative to their respective disk surfaces 26.

Referring again to FIG. 1A, the base plate 22 is designed to receive the voice-coil motor magnet assembly 20, the actuator arm assembly 18 and disks 12 (along with hub 14 and disk clamp 16, which together form a disk stack). The cover 24 cooperates with the base plate 22 to form an air-tite seal about the disks 12, the actuator arm assembly 18 and the voice-coil motor magnet assembly 20, to keep contaminants from interfering with the writing of information to and the reading of information from the disk surfaces 26. As is well-known in the art, the sealed combination of the disks 12, the actuator arm assembly 18 (which includes the transducers 30 (or heads)), and the voice-coil motor magnet assembly 20 is known as a head disk assembly (HDA).

Figure 2:
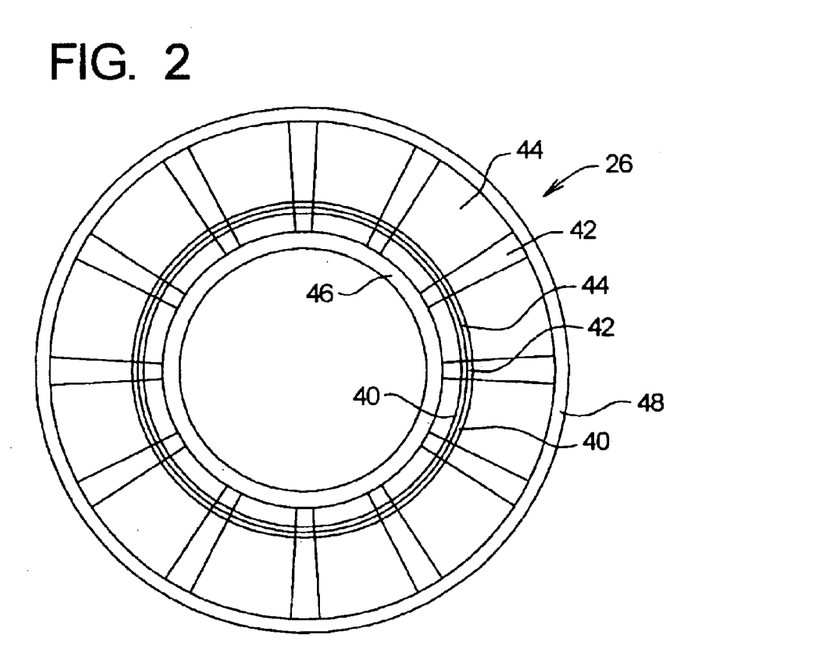
FIG. 2 is an illustration of a disk surface having servo information thereon, to be used in conjunction with a sectored servo system.

FIG. 2 shows a disk surface 26 having a sectored servo pattern recorded thereon. The formatted disk surface 26 includes a plurality of concentric tracks 40 (only two tracks are shown) which include both servo sectors 42 and data sectors 44. As shown in the figure, servo sectors 42 are interspersed between adjacent data sectors 44 and form "servo-wedges" which span from an inner guardband 46 of the disk surface 26 to an outer guardband 48 of the disk surface 26. In general, no servo information or data is stored within either the inner guardband 46 or outer guardband 48 of the disk surface 26.

As is well-known in the art, servo information recorded in the servo sectors 42 is read by a transducer 30 (see FIGS. 1A and 1B) corresponding to a disk surface 26. Servo information is used both during seek operations (i.e., when moving the transducer 30 between tracks 40) and during track following operations (i.e., when positioning the transducer 30 at a specified location relative to a track's centerline so that the transducer 30 is appropriately aligned for reading data from or writing data to data sectors 44).

As mentioned in the Background of the Invention section, there are, in general, two main types of servo systems namely, sectored servo systems and dedicated servo systems (both of which are well-known). The present invention is not intended to be limited to a particular type of servo writing for a servo system, even though only a disk surface formatted for a sectored servo system is shown.

In order to aid in the understanding of the present invention, its structure and operation will first be described rather generally and then the details of certain preferred components of the invention will follow.

Figure 3:
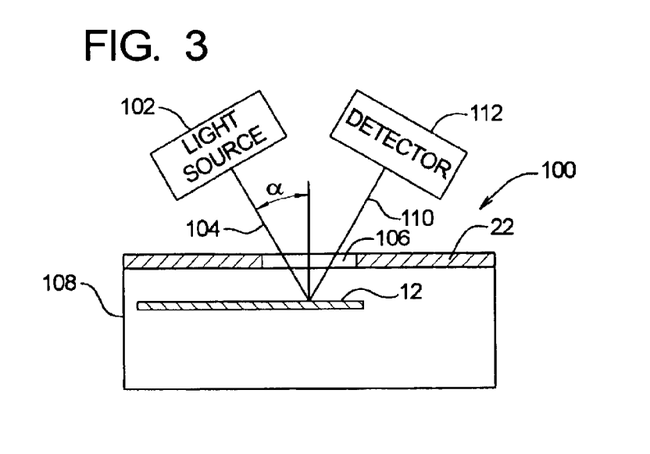
FIG. 3 is a simplified representation of one embodiment of the present invention.
Figure 4:
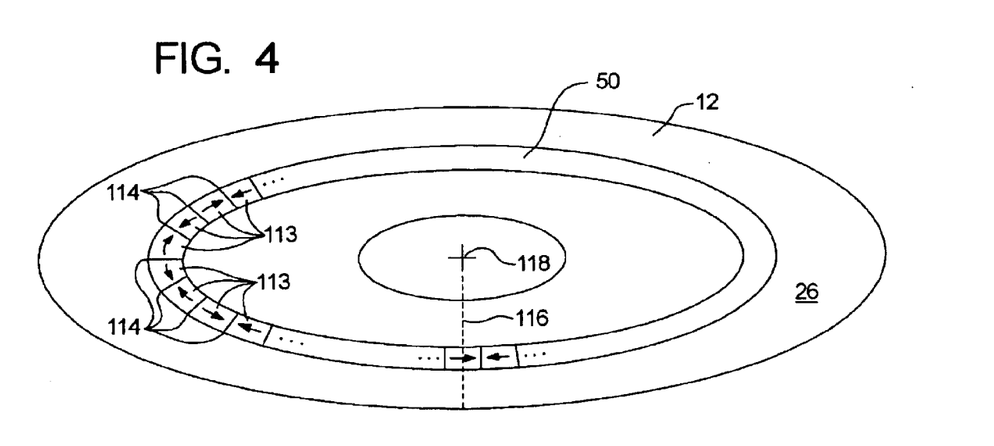
FIG. 4 is an enlarged representation of a disk having an exaggerated clock track thereon.

FIG. 3 is a simplified representation of a cross-sectional view of an embodiment of the apparatus 100 of the present invention, while FIG. 4 is an enlarged representation of a disk 12 having an exaggerated clock track 50 which is to be read by the magneto-optical clock head 100 of the present invention. As shown by way of FIGS. 3 and 4, the magneto-optical clock head 100 includes a light source 102 and a detector 112. The light source 102 produces a laser beam 104 which is directed through a window 106 in the baseplate 22 (or alternatively the cover 24) of the HDA 108 towards a clock track 50 upon which a clock signal is stored. (Note: The HDA 108 is shown upside down as compared to the disk drive 10 shown in FIG. 1A.) A reflected beam 110 is reflected off of the clock track 50, directed out of the HDA 108 through the window 106 (or another window) and detected by a detector 112 located outside of the HDA 108. The detector 112 is designed to detect changes in the magnitude of the reflected beam 110, which changes are representative of the clock signal stored within the clock track 50 due to the transverse Kerr effect. The detected information is then provided to the transducers 30 of the disk drive system 10, so that servo information can be appropriately written onto the disk surfaces 24.

More specifically, as shown in FIG. 4, the clock signal stored on the clock track 50 includes stored sections of alternating magnetization 113. When the disk surface is magnetized in a first direction, the reflected beam 110 has a first intensity. When the disk surface is magnetized in a second direction, the reflected beam 110 has a second intensity, wherein the first intensity and second intensity are different from one another. Thus, by detecting changes in the intensity of the reflected beam 110, the system 100 can detect when changes in magnetization of the clock track 50 occur and, hence, can read the clock signal.

Figure 5:
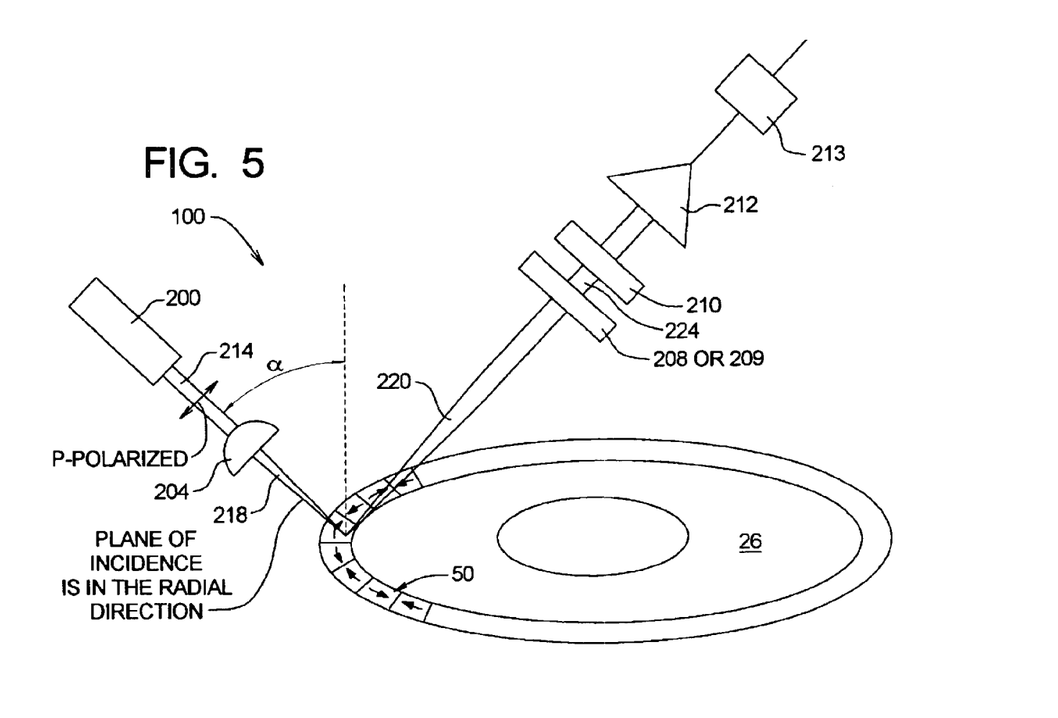
FIG. 5 is a simplified representation of the preferred embodiment of the present invention; and, FIG. 6 is a block diagram of one embodiment of the photodetector, amplifier and clock electronics of the present invention.

FIG. 5 is a simplified representation of the preferred embodiment of the present invention. As shown therein, the magneto-optical clock head 100 includes a collimated laser 200, a focusing lens 204, a diffuser 208, a photodetector 210, an amplifier 212 and clock electronics 213. The collimated laser 200 generates a generally circularly shaped collimated beam 214 having a wavelength of approximately 780 nm. Importantly, the laser beam 214 is p-polarized as it is generated by the laser 200. The p-polarized beam 214 then passes through the focusing lens 204 (which, in the preferred embodiment, is a 62 mm focal length lens) to produce a focused beam 218 which is directed through the window 106 (not shown) and focused at the clock track 50 on the disk surface 26. The 62 mm focal length lens is used to focus the beam to preferably a 12 $\mu$m spot at the surface 26 of the disk 12. Due to the beam's angle of incidence to the disk 12, the beam image on the disk 12 is an ellipsoid. The major axis dimension of the ellipsoid is 24 $\mu$m in the disk's radial direction and the minor axis dimension of the ellipsoid is 12 $\mu$m in the disk's circumferential direction. The beam's depth of focus is set so that it accounts for manufacturing tolerances associated with the disk stack assembly (i.e., the combination of the disks 12, hub 14 and disk clamp 16), which are generally around ±6 mils.

After the focused beam 218 strikes the clock track 50, a reflected beam 220 is produced. The reflected beam 220 is then directed through the diffuser 208 to produce a diffused reflected beam 224. The diffuser 208 is used to remove the affects of the run out of the disk 12 (its up and down motion) as it pertains to the reflected beam 220. The diffused reflected beam 224 is aligned to be received by the photo detector 210 which produces an electrical signal representative of the intensity of the diffused reflected beam 224. The amplifier 212 receives the electrical signal and amplifies such signal. The clock electronics 213 receive the electrical signal and perform additional signal processing prior to delivering the processed signal to existing clock processing electronics (see FIG. 6). The resulting clock signal is used to direct the transducers 30 to write servo information onto their respective disk surfaces 24.

The Transverse Kerr Effect

In order to optimize the detection of the variations in intensity of the reflected beam 220, it would be beneficial to substantially maximize the transverse Kerr effect for the magneto-optical clock head 100. There are a number of factors associated with maximizing the transverse Kerr effect including: the orientation of the transitions written on the clock track 50 in combination with the orientation of the beam 104; the polarization of the beam 104; the angle at which the beam 104 strikes the clock track 50 in combination with the reflectivity of the window 106; and, the wavelength of the beam 104. In developing the preferred embodiment of the invention, the above factors (and others) were taken into account. The above factors will be described below in connection with FIGS. 3–5.

Orientation of Transitions Written on the Clock Track and the Beam

As mentioned in connection with FIG. 4, the clock signal is stored within the clock track 50 in the form of sections of alternating magnetization 113 that form magnetic transitions 114. As illustrated by the ellipses shown in FIG. 4, the sections of alternating magnetization 113 and, hence the magnetic transitions 114, extend around the entire clock track 50.

In order for the transverse Kerr effect to be maximized, the sections of alternating magnetization 113 should be substantially longitudinally recorded (as shown in FIG. 4), instead of being perpendicularly recorded, as will be understood by those skilled in the art. Accordingly, the transitions 114 are in the radial direction, while the sections of alternating magnetization 113 are perpendicular to radial lines 116 (only one radial line 116 is shown in FIG. 4) extending from the center 118 of the disk 12. (The exaggerated size of the clock track 50 and sections of alternating magnetization 113 prevents this from being easily shown in FIG. 4. Nevertheless, longitudinal recording is a concept that is very well-known to those skilled in the art.)

In addition, to maximize the transverse Kerr effect, the beam 104 (which is p-polarized, as will be described in more detail below) should strike the sections of alternating magnetization 113 in a perpendicular (or transverse) manner. (Hence, the name transverse Kerr effect.) Accordingly, when the sections of alternating magnetization 113 are substantially perpendicular to the radial line 116 extending from the center 118 of the disk 12, the plane formed between the incident laser beam 104 and the reflected beam 110 is aligned so that it falls along a radius of the disk 12. The magnitude of the reflected beam 110 will vary based upon the direction of magnetization in the various sections of alternating magnetization 113. The detector 112 will detect the changes in magnitude of the reflected beam 110, indicating where the transitions 114 occur in the clock signal.

It should be noted that, in some instances, the directions of magnetization in the sections of alternating magnetization 113 are not written perpendicularly with respect to the radial line 116 extending from the center 118 of the disk 12. This occurs, for example, when the transducer 30 (more specifically, its write element, which is not shown) is skewed while writing the sections of alternating magnetization 113 onto the disk 12, as will be understood by those skilled in the art. In such case, the beam 104 would be directed in such a fashion as to compensate for the skew. Therefore, the plane formed between the beam 104 and the reflected beam 110 would be aligned such that it would be substantially perpendicular to the sections of alternating magnetization 113. Determining the skew associated with the sections of alternating magnetization 113 is something that is understood by those skilled in the art.

Polarization of the Beam 104

Another factor associated with maximizing the transverse Kerr effect is the polarization of the beam 104. Specifically, the beam 104 should be p-polarized. In other words, the beam 104 must have a polarization which lies in the plane formed by the incident beam 104 and the reflected beam 110. In addition, the polarization of the beam 104 is such that it is perpendicular to the direction of travel of the beam. Accordingly, the beam 104 has a polarization that is perpendicular to the sections of alternating magnetization 113.

Angle at Which the Beam 104 Strikes the Clock Track 50 and the Reflectivity of the Window Maximization of the transverse Kerr effect is also dependent upon the angle, $\alpha$, at which the beam 104 strikes the clock track 50. The transverse Kerr effect is maximized at an angle, $\alpha$, of approximately 70 degrees. However, it could be sensed between angles of approximately 30 degrees and 85 degrees. In the preferred embodiment of the invention, the angle of incidence, $\alpha$, is 60 degrees.

In arriving at the preferred angle, $\alpha$, of 60 degrees, certain considerations regarding the window 106 and the clock track 50 were taken into account. More specifically, since the preferred material for the window 106 is Mylar, the reflectivity of a window made of Mylar was considered. Since Brewster's angle for the Mylar window is approximately 60 degrees, reflections would be minimized by choosing such an angle. Furthermore, if a larger included angle, $\alpha$, was used, the size of the window 106 would be bigger and reflections would increase.

One might try to severely reduce the size of the window by choosing smaller values of included angle, $\alpha$. However, if a much smaller included angle, $\alpha$, was used, (1) there would be more reflections off of the window 106; and, (2) a smaller signal would be produced, which would degrade the signal-to-noise ratio. In view of the above, a preferred angle, $\alpha$, of 60 degrees was chosen to be a compromise between the maximum magnitude of the transverse Kerr effect and the minimum reflectivity from the window's surface. Of course, other angles, $\alpha$, may be used.

Wavelength of the Beam 104

Yet another factor that should be considered in attempting to maximize the transverse Kerr effect is the wavelength of the beam 104. The transverse Kerr effect is wavelength dependent based upon the ferro-magnetic material on which the sections of alternating magnetization 113 are written. The preferred embodiment of the magneto-optical clock head 100 has been designed to operate in conjunction with ferro-magnetic material made of Cobalt, which produces a greater transverse Kerr effect at greater wavelengths. Accordingly, in the preferred embodiment, the laser beam 104 was selected to have a wavelength of approximately 780 nm.

An additional reason for choosing a preferred wavelength of 780 nn (a near infra-red wavelength) is that near infra-red laser diodes are available in low noise versions, which allow good signal-to-noise ratio detection. Other considerations such as laser diodes that are long-lasting and readily available may also play a part in selecting the wavelength of the beam 104. It should be noted, as will be understood by those skilled in the art, that a beam 104 having a wavelength other than 780 nm may be used. For example, if the disk 12 was coated with a ferro-magnetic material other than Cobalt, the wavelength of the beam 104 may be chosen to maximize the transverse Kerr effect for such material.

Further Description of and Variations to the Components of the Preferred Embodiment It should be noted that various modifications can be made to the preferred embodiment. For example, in the preferred embodiment of the invention, the light source 102 includes a collimated laser diode 200 and a 62 mm focal length lens 204. Instead of using a laser diode, a gas laser (such as a He—Ne laser) or some other solid-state laser other than a laser diode may be used. Similarly, instead of using a laser diode with a built-in collimated lens (not shown) and a separate 62 mm focal length lens, a single lens designed to both collimate and focus the beam may be used.

Furthermore, instead of using a 62 mm focal length lens 204, a first focusing lens having a different focal length could have been used. However, in the preferred embodiment, a 62 mm focal length was chosen because a focal length which is substantially greater than 62 mm would require a lower frequency clock track to be written, while a focal length substantially less than 62 mm would require consideration of autofocus (potentially increasing costs, decreasing reliability and adding to the complexity of the system). Thus, in the preferred embodiment, a 62 mm focal length lens 204 was chosen so that a 1 MHz clock track could be sensed and so that autofocus would not be required.

Modifications may also be made to the preferred embodiment to add a second focal length lens through which the reflected beam 220 would pass prior to reaching the diffuser 208. The second focal length lens might have a focal length, for example, of 62 mm. In addition to recollimating the reflected beam 220, a second focal length lens would allow for a slightly longer path length so that the optical components could be more easily aligned at a distance further from the window 106. It should be noted, however, that a second lens (having an appropriate focal length) might be required if the focal length of the first focal lens were shortened.

In order to ensure that the incident beam is p-polarized, a p-linear polarizer might be inserted between the collimated laser 200 and the focal length lens 204. By using a p-linear polarizer, the reflected signal could be improved thereby increasing the signal-to-noise ratio.

As mentioned above, the photodetector 210 senses changes in the intensity of the reflected beam 220 based upon the magnetization differences within the clock track 50. In the preferred embodiment, the photodetector is a PN photodiode which is utilized in photoconductive mode with a cutoff frequency greater than 1 MHz.

The output of the photodetector 210 is coupled to amplifier 212 to amplify the output signal of the photodetector 210. Preferably, the amplifier 212 is a transimpedance amplifier which converts the photodetector's output signal from a current signal to a voltage signal. In addition, the amplifier 212 is preferably selected for low noise and has a bandwidth greater than 1 MHz.

Since the disk 12 has a highly reflective surface 24, the signal detected by the photodetector 210 will include a DC component from the disk surface 26 and an AC component due to the changes in magnetization of the clock track 50. The AC component is superimposed on top of the DC component. Since the DC component is not reflective of the information stored within the clock track 50, it is filtered out via the clock electronics 213, leaving only the AC component. As will be understood by those skilled in the art, there are many ways to remove the DC signal. For example, the DC signal may be removed by using a capacitor using a procedure commonly known as AC coupling. Alternatively, other known filtering techniques may be employed.

Figure 6:
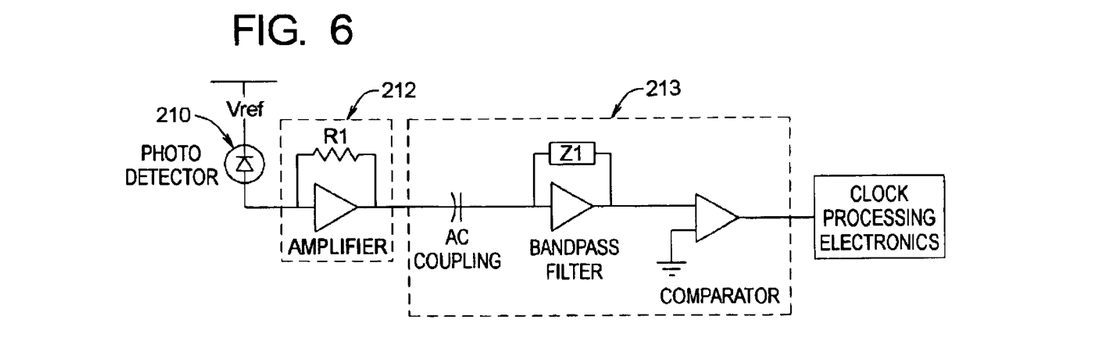

In the clock electronics 213, the AC signal is then coupled to a bandpass filter, which is used to improve the signal-to-noise ratio. The bandpass filter preferably has a center frequency approximately equal to the frequency of the clock track and, in one embodiment, a bandwidth of preferably 15 kHz. The filtered AC signal is then coupled to a comparator, which detects and squares up the zero crossings of the filtered AC signal and converts such signal to logic voltage levels. The resulting signal is then provided to existing clock processing electronics. A block diagram of one embodiment of the photo detector 210, the amplifier 212 and the clock electronics 213 is shown in FIG. 6.

In order to minimize the affects of the run out (up and down motion) of the disk 12, the reflected beam 220 is directed through the diffuser 208 before reaching the photodetector 210 in the preferred embodiment. As will be understood by those skilled in the art, the run out of the disk 12 can cause the beam to wobble or move on the photodetector 210 which, in turn, will cause an unwanted AC component in the detected signal. The diffuser substantially removes the unwanted AC component caused by the run out of the disk 12.

As an alternative to the diffuser 208, an integrating sphere 209 may be used. In such case, the reflected beam 220 would enter the integrating sphere 209 which would remove all position sensitivity. Thus, the unwanted AC component caused by the run out of the disk 12 would be removed. It should be noted that the diffuser 208 is preferred over the integrating sphere 209 because the diffuser 208 is simpler, smaller and less expensive. Furthermore, most systems should not be subjected to a great amount of motion, which would allow the diffuser 208 to handle the removal of the unwanted AC component caused by the run out of the disk 12 just as easily as the integrating sphere 209 could.

The window 106 may also take on different forms. Preferably, the window 106 is shaped like a generally rectangular slot that has a pair of radiused ends. In such case, the window 106 has a slot which is approximately ¼ inch long and approximately 100 mils wide. Alternatively, the window 106 may take an oval-type shape, the key being that the incident beam 104 and the reflected beam 110 should be allowed to enter and exit the HDA in an appropriate fashion. As a further alternative, multiple windows may be provided.

Preferably, the window 106 is transparent and made of Mylar. However, it should be understood that other transparent or semi-transparent materials may be used in place of Mylar.

Writing the Clock Track

Prior to reading the clock signal stored on the clock track 50 which, in turn, is used for properly writing servo information onto disk surfaces 24, the clock track 50 must be written onto one of the disk surfaces 24. Generally, the clock track 50 is written to the uppermost disk surface or the lowermost disk surface of the plurality of disks 12 shown in FIG. 1A, since such surfaces are generally most easily read by the magneto-optical head 100. Preferably, the clock track 50 should be written at as large a radius as possible, in order to maximize spot size and the distance between transitions. In one embodiment, the clock track 50 is written at a radius of approximately 40 mm. It will be understood that other values besides 40 mm may also be used.

The clock track 50 is written by the transducer 30 associated with the disk surface 26 upon which the clock track 50 is to be written. Accordingly, a STW transducer is not required. Thus, the magneto-optical head 100 may be thought of as a replacement for the STW transducer in connection with the STW transducer's function of reading the clock track 50.

In order to write the clock track 50, the transducer 30 is positioned at a predetermined radius along the surface 24 of the disk 12 upon which the clock track 50 is to be written by using an optical push-pin or other non-contact technique. Next, the clock track 50 is written by the transducer 30 while the disk 12 spins below it at approximately its normal operating frequency. The transducer 30 then reads the clock track 50 it has written to ensure that the pattern is perfectly periodic around the disk, so that the beginning and end of the clock track 50 are properly aligned. (This is also known as closure.) If the clock track 50 is not perfectly periodic, it is re-written. This trial-and-error process is continued until the transducer 30 properly writes the clock track 50. (The trial-and-error process of verifying closure is the traditional way of writing clock tracks.)

One unique aspect of the present invention is that, for present-day systems, it requires a clock track 50 that is wider than the width of a single track 40. At present, a single track 40 is approximately a micron wide. In contrast, the laser beam 104 of the preferred embodiment of the present invention has a spot size of 12×24 microns (but can be variable), with its longer dimension in the radial direction. Accordingly, the width of the clock track 50 should be designed to accommodate the width of the beam and the tolerances of the STW and HDA mechanics. To achieve an appropriate clock track width, the inventors have proposed two methods.

The first process is known as "dragging the clock track." More specifically, the above-described trial-and-error process is used to write a clock track 50 (with closure) having the width of a single track 40. A non-contact positioning technique (e.g., optical push-pin system) is used to position the transducer 30 about a half track off of the portion of the properly-written clock track 50. Next, the transducer 30 is used to write a second section of the clock track 50 in-phase with the first section of the clock track 50. This process is repeated until a clock track 50 having an appropriate width is provided.

The second process is to pre-write a clock track 50 of an appropriate width during a certification process. As will be understood by those skilled in the art, a certifier is used to test disk surfaces to make sure that the disk is functioning properly. More specifically, the certifier first writes patterns onto the disk surface and then reads the patterns it has written. Once the disk surface has been tested, the patterns written onto the disk surface are erased. In order to reduce the amount of time necessary to write patterns onto the disk surface, a certifier typically uses a large write head. For example, a certifier may include a head which writes a pattern having a width sufficient for purposes of the present invention. Accordingly, instead of erasing all of the patterns on a disk surface once the disk surface has passed its certification test, the inventors propose that one pattern (a clock track 50 exhibiting closure) be left on the disk surface. Preferably, the clock track 50 should be written outside of the data zone, for example, in the outer guardband 48 shown in FIG. 2. For purposes of the present invention, using the certifier technique is preferred.

In the case of using the certifier technique, no provision need be made to ensure that the clock track 50 is not overwritten because the clock track 50 is outside of the data zone (unless, of course, one chose to write in the data zone). However, in the case of using the "dragging" technique, certain accommodations must be made in order to either: (1) ensure that the clock track is not overwritten by servo information; or, (2) to avoid using certain sections of the clock track that will be overwritten by servo information. In the first case, portions of the disk surface 26 will not be useable due to clock information, not servo information, being written thereon. In the second case, a coasting clock may be used wherein the system is designed to ignore certain portions of the clock track that have been (or will be) overwritten by servo information, as will be understood by those skilled in the art.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. An apparatus for servo-writing a magnetic disk drive which has a substantially sealed housing and a rotatable magnetic data storage disk located within the housing, comprising:

a transducer positioned inside the sealed disk drive for writing a servo track at first radius;

a transparent window, located proximate the disk, through which an optical beam, that is p-polarized and is directed at a disk surface including a clock track written theron, may enter the disk drive and through which a component of the optical beam reflected from the clock track may exit the disk drive, wherein said clock track includes sections of alternating magnetization which are directed in opposite directions, and wherein the p-polarized beam is aligned such that it is transverse to the directions of alternating magnetization; and a magneto-optical head, positioned external to the sealed disk drive and adjacent the transparent window, for producing the optical beam and reading the clock track through the transparent window by measuring the changes in magnitude of the beam reflected from the clock track, wherein the optical beam and the component of the optical beam reflected from the clock track form a plane, and wherein the plane is substantially transverse to the directions of alternating magnetization.

2. The apparatus of claim 1 wherein the plane is substantially along a radial line passing through a center of the disk.

3. The apparatus of claim 1 wherein the optical beam enters the window at an angle, the angle being approximately equal to Brewster's angle for the material of the window.

4. The apparatus of claim 1 wherein the magneto-optical head includes a detector positioned to receive the beam reflected from the clock track, and wherein said detector senses changes in magnitude of the beam reflected from the clock track and generates an electrical output signal in response thereto.

5. The apparatus of claim 4 wherein the electrical output signal includes a DC component relating to reflections of the optical beam off of the disk surface and an AC component relating to reflections of the optical beam off of the clock track.

6. The apparatus of claim 5 further including a filter for filtering out the DC component.

7. The apparatus of claim 6 wherein the filter includes a capacitor.

8. The apparatus of claim 4 wherein the electrical output signal includes an unwanted AC component due to an up/down motion of the disk surface.

9. The apparatus of claim 4 further including a diffuser through which the reflected beam passes, so as to substantially prevent the electrical output signal from including an unwanted AC component due to an up/down motion of the disk surface.

10. The apparatus of claim 4 further including an integrating sphere through which the reflected beam passes, so as to substantially prevent the electrical output signal from including an unwanted AC component due to an up/down motion of the disk surface.

11. An apparatus for reading a clock track located on a disk surface, the clock track including a first magnetization state having a first magnetization direction and a second magnetization state having a second magnetization direction, the changes in magnetization states being reflective of a clock signal and being longitudinally recorded, the disk surface being located within a sealed head disk assembly, optical access being provided to the sealed head disk assembly via a window, the apparatus comprising:

a light source for generating a p-polarized beam directed at the disk surface, including the clock track located thereon, to produce a reflected beam which exits the sealed head disk assembly via the window; and, a detector, located outside of the sealed head disk assembly, aligned to receive the reflected beam and configured to sense changes in the magnetization states of the reflected beam, and, hence, the clock signal, based upon changes in magnitude of the reflected beam, wherein the p-polarized beam and the reflected beam form a plane, and wherein the plane is substantially transverse to the first and second magnetization directions.

12. The apparatus of claim 11 wherein the optical beam enters the window at an angle, the angle being approximately equal to Brewster's angle for the material of the window.

13. The apparatus of claim 11 wherein the detector generates an electrical output signal in response to sensing changes in magnitude of the reflected beam.

14. The apparatus of claim 13 wherein the electrical output signal includes a DC component relating to reflections off of the disk surface and an AC component relating to reflections off of the clock track.

15. The apparatus of claim 14 further including a filter for filtering out the DC component.

16. The apparatus of claim 13 wherein the electrical output signal includes an unwanted AC component due to an up/down motion of the disk surface.

17. The apparatus of claim 13 further including a diffuser through which the reflected beam passes, so as to substantially prevent the electrical output signal from including an unwanted AC component due to an up/down motion of the disk surface.

18. The apparatus of claim 13 further including an integrating sphere through which the reflected beam passes, so as to substantially prevent the electrical output signal from including an unwanted AC component due to an up/down motion of the disk surface.

19. A magneto-optical clock head for reading a clock track stored on a disk surface which is sealed within a disk drive, the clock track including longitudinally recorded sections of alternating magnetization recorded therein, wherein the sections of alternating magnetization are directed in opposite directions, the disk drive including a window, the magneto-optical clock head comprising:

a light source for generating a p-polarized laser beam directed through the window and at the disk surface, including the clock track located thereon, such that the p-polarized beam is substantially transverse to the longitudinally recorded sections of alternating magnetization, wherein a reflected beam is generated having a magnitude indicative of a polarity of the sections of alternating magnetization, the reflected beam being directed out of the window; and, a detector for detecting changes in magnitude of the reflected beam to produce a clock signal, wherein the p-polarized beam and the reflected beam form a plane, and wherein the plane is substantially transverse to the directions of alternating magnetization.

20. The apparatus of claim 19 wherein the p-polarized beam enters the window at an angle, the angle being approximately equal to Brewster's angle for the material of the window.

21. The apparatus of claim 19 wherein the detector generates an electrical output signal in response to sensing changes in magnitude of the reflected beam.

22. The apparatus of claim 21 wherein the electrical output signal includes a DC component relating to reflections off of the disk surface and an AC component relating to reflections off of the clock track.

23. The apparatus of claim 22 further including a filter for filtering out the DC component.

24. The apparatus of claim 21 wherein the electrical output signal includes an unwanted AC component due to an up/down motion of the disk surface.

25. The apparatus of claim 21 further including a diffuser through which the reflected beam passes, so as to substantially prevent the electrical output signal from including an unwanted AC component due to an up/down motion of the disk surface.

26. The apparatus of claim 21 further including an integrating sphere through which the reflected beam passes, so as to substantially prevent the electrical output signal from including an unwanted AC component due to an up/down motion of the disk surface.

27. A method for optically reading a clock signal stored within a clock track, the clock track being written on a disk surface sealed within a head disk assembly of a disk drive and the clock track including sections of alternating magnetization which are directed in opposite directions, the method comprising the steps of:

generating a p-polarized beam;

directing said p-polarized beam into the head disk assembly so that it strikes the disk surface, including the clock track located thereon, to produce a reflected beam which is reflected out of the head disk assembly;

detecting changes in magnitude of the reflected beam, said changes being indicative of the clock signal stored within the clock track, wherein the p-polarized beam and the reflected beam form a plane, and wherein the plane is substantially transverse to the directions of alternating magnetization.

28. The method of claim 27 wherein the p-polarized beam is directed through a window which provides the p-polarized beam access to the head disk assembly, the p-polarized beam striking the window at an angle approximately equal to Brewster's angle for the material of the window.

29. The method of claim 27 further including the step of outputting an electrical output signal based upon the detected changes in magnitude of the reflected beam.

30. The method of claim 29 wherein the electrical output signal includes a DC component relating to reflections off of the disk surface and an AC component relating to reflections off of the clock track.

31. The method of claim 29 further including the step of filtering out the DC component.

32. The method of claim 29 wherein the electrical output signal includes an unwanted AC component due to an up/down motion of the disk surface.

33. The method of claim 29 further including the step of substantially preventing the electrical output signal from including an unwanted AC component due to an up/down motion of the disk surface.

34. A method comprising the steps of:

providing a clock track written onto a disk surface; and, optically reading said clock track using the Transverse Kerr Effect.

35. The method of claim 34, wherein the disk surface is sealed within a head disk assembly of a disk drive and wherein the clock track includes sections of alternating magnetization which are directed in opposite directions.

36. The method of claim 35 further comprising the steps of:

generating a p-polarized beam;

directing said p-polarized beam into the head disk assembly so that it strikes the disk surface, including the clock track located thereon, to produce a reflected beam which is relected out of the head disk assembly;

detecting changes in magnitude of the reflected beam, said changes being indicative of the clock signal stored within the clock track.

37. The method of claim 36, wherein the p-polarized beam and the reflected beam form a plane, and wherein the plane is substantially transverse to the directions of alternating magnetization.

38. The method of claim 36, wherein the p-polarized beam is directed through a window which provides the p-polarized beam access to the head disk assembly, the p-polarized beam striking the window at an angle approximately equal to Brewster's angle for the material of the window.

39. The method of claim 36 further including the step of outputting an electrical output signal based upon the detected changes in magnitude of the reflected beam.

40. The method of claim 39 wherein the electrical output signal includes a DC component relating to reflections off of the disk surface and an AC component relating to reflections off of the clock track.

41. The method of claim 40 further including the step of filtering out the DC component.

42. The method of claim 39 wherein the electrical output signal includes an unwanted AC component due to an up/down motion of the disk surface.

43. The method of claim 39 further including the step of substantially preventing the electrical output signal from including an unwanted AC component due to an up/down motion of the disk surface.

* * * * *